United States Patent [19]
Wickramanayake et al.

[11] Patent Number: 6,036,759
[45] Date of Patent: Mar. 14, 2000

[54] BLACK TO COLOR BLEED CONTROL IN INK-JET PRINTING INKS

[75] Inventors: Palitha Wickramanayake; Raymond J. Adamic, both of Corvallis, Oreg.

[73] Assignee: Hewlett-Packard Company, Palo Alto, Calif.

[21] Appl. No.: 09/070,858

[22] Filed: Apr. 30, 1998

[51] Int. Cl.[7] .................................................. C09D 11/02
[52] U.S. Cl. ..................................... 106/31.28; 106/31.59; 106/31.6; 106/31.89; 106/31.43; 106/31.75
[58] Field of Search ............................. 106/31.28, 31.59, 106/31.6, 31.89, 31.43, 31.75

[56] References Cited

U.S. PATENT DOCUMENTS

| | | | |
|---|---|---|---|
| 5,181,045 | 1/1993 | Shields et al. | 346/1.1 |
| 5,198,023 | 3/1993 | Stoffel | 106/22 R |
| 5,320,668 | 6/1994 | Shields et al. | 106/20 R |
| 5,428,383 | 6/1995 | Shields et al. | 347/96 |
| 5,476,540 | 12/1995 | Shields et al. | 106/20 R |
| 5,488,402 | 1/1996 | Shields et al. | 347/96 |
| 5,518,534 | 5/1996 | Pearlstine et al. | 106/20 R |
| 5,536,306 | 7/1996 | Johnson et al. | 106/22 R |
| 5,555,008 | 9/1996 | Stoffel et al. | 347/100 |
| 5,679,143 | 10/1997 | Looman | 106/20 R |
| 5,700,317 | 12/1997 | Adamic | 106/31.58 |
| 5,713,993 | 2/1998 | Grezzo Page et al. | 106/31.85 |
| 5,730,790 | 3/1998 | Rehman | 106/31.59 |
| 5,735,941 | 4/1998 | Feeman et al. | 106/31.28 |
| 5,750,594 | 5/1998 | Page et al. | 106/31.76 |
| 5,785,743 | 7/1998 | Adamic et al. | 106/31.27 |
| 5,853,465 | 12/1998 | Tsang et al. | 106/31.27 |

FOREIGN PATENT DOCUMENTS

0838507A1  4/1998  European Pat. Off. ........ C09D 11/00

*Primary Examiner*—Helene Klemanski
*Attorney, Agent, or Firm*—Michael D. Jones

[57] ABSTRACT

The ink set of this invention comprises an anionic black pigmented ink and at least one color ink containing a dye or pigment colorant. The performance of these ink sets is improved by the addition of specific cationic surfactant or cationic (quaternary) salts which interact with the anionic black pigmented ink to provide improved black to color bleed control.

24 Claims, No Drawings

BLACK TO COLOR BLEED CONTROL IN INK-JET PRINTING INKS

TECHNICAL FIELD

The present invention relates to ink-jet inks employed in ink-jet printing, and more particularly, to an ink system which utilizes the addition of a cationic salt or surfactant to the color ink and an anionic pigment-based black ink.

BACKGROUND ART

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

On operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many ink-jet inks, when printed in various colors on bond paper, copier paper, and other media, can lead to bleed. Bleed occurs as colors mix both on the surface of the paper being printed on and in the paper. The term "bleed", as used herein, is defined as follows: When inks of two different colors are printed next to each other, it is desired that the border between the two colors be clean and free from the invasion of one color into the other. When one color does invade into the other, the border between the two colors becomes ragged, and this is called bleed.

This is in contradistinction to uses of the term in the prior art, which often defines "bleed" in the context of ink of a single color following the fibers of the paper.

Prior solutions to bleed have largely involved the use of heated platens or other heat sources and/or special paper. Heated platens add cost to the printer. Special paper limits the user to a single paper, which is of a higher cost than a "plain" paper. Another way to reduce bleed involves increasing the penetration rate of the ink into the paper. However, increasing the penetration rate reduces the edge acuity (lowers the print quality of the ink). Nevertheless, this method is acceptable for printing color ink because of the lesser importance of color text quality. However, print quality is important for black ink. And hence alternate bleed control mechanisms are needed.

U.S. Pat. No. 5,428,383 teaches a method to control bleed in multicolor ink-jet printing involving the use of multivalent metal salts as precipitation agents in a first ink composition. The precipitation agent is designed to react with the coloring agent in a second ink composition.

A solution to the specific problem of black to yellow color bleed is disclosed in U.S. Pat. No. 5,198,023 wherein multivalent cations such as calcium chloride and magnesium chloride are added at concentrations ranging from about 1 to about 10 wt % to yellow cationic inks to prevent bleed between yellow and black inks. However, it has been determined that the addition of large amounts multivalent cations to thermal ink-jet ink compositions may induce precipitation of dye salts, requiring further adjustments in the ink composition.

U.S. Pat. No. 5,518,534 teaches the use of a first ink having a pigment dispersion and the second ink containing a salt of an organic acid or mineral acid wherein said salt reacts with said first ink to alleviate bleed between the inks. However, in this case, the pigment requires the presence of a dispersing agent, and both inks must have the same ionic character.

A method to control bleed is also disclosed by U.S. Pat. No. 5,730,790. The ink-jet ink is formulated to comprise at least one dye-based ink composition and at least one pigment-based ink. The dye-base ink also contains a cationic surfactant, and the pigment-base ink contains a negatively-charged dispersant.

Another method of reducing bleed between ink-jet inks involves the use of pH-sensitive dyes as disclosed in U.S. Pat. No. 5,181,045. It discloses an ink having a pH-sensitive dye to prevent bleeding to an adjacent ink having an appropriate pH. Migration of the ink having the pH-sensitive dye is prevented by rendering the dye insoluble on the page by contact with the pH of the adjacent ink. This method requires a pH differential of about 4 or 5 units to completely control bleed. Accordingly, a pH not exceeding 4 would be required to effectively eliminate bleed from a pH-sensitive ink having a typical pH of about 8.

U.S. patent application, Ser. No. 08/567,974, now U.S. Pat. No. 5,785,743, builds upon the '045 case referenced above, but an organic acid component is added to the so-called target ink-jet ink composition, as opposed to the pH-sensitive ink composition. The organic acid component reduces the pH differential required to control bleed to about 3 units or less.

While each of the above has produced varying degrees of success, a need still remains for ink compositions for use in ink-jet printing which do not evidence bleed, as defined herein, when printed on plain papers, and yet which posses relatively long shelf life and other desirable properties of such inks.

DISCLOSURE OF INVENTION

In accordance with the invention, an ink set is provided in which bleed between color and black is reduced by using at least one anionic pigment in black ink and at least one cationic surfactant or salt in the color ink. This ink formula is very effective in reducing black-to-color bleed without requiring the black ink to penetrate quickly. The color ink may contain nonionic, cationic, or anionic dyes.

BEST MODES FOR CARRYING OUT THE INVENTION

In considering the problems of bleed reduction involving a set of cyan, magenta, yellow, and black inks, which, when printed in various combinations, provide all of the color combinations, it is important to note that yellow ink is the worst bleeder visually because of the contrast between yellow and any of the other inks, but especially black ink. That is to say, all other things being equal, bleeding is not as visually apparent between any combination of cyan, magenta, and black inks as it is between yellow ink and black ink. Accordingly, particular emphasis should be placed on bleed between yellow ink and the black ink in the ink set.

In one approach, the black pigment employed in the black ink is a self-dispersing anionic pigment. Such anionic pigments suitable for use herein include all chemically modified water-dispersible, anionic, black pigments known for use in ink-jet printing. These chemical modifications impart water-dispersiblity to the pigment precursors that encompass all organic pigments. Under typical chemical processes, the resulting surfaces consist of carboxylate and/or sulfonate functionalities. As commercially available, the anionic pigments are usually associated with $Na^+$, $Li^+$, $K^+$, and $NH_4^+$ cations, although any suitable counterion may be used herein. Many of suitable water-dispersible black pigments are commercially available from colorant vendors such as Cabot Corp. and Orient Chemical. See U.S. Pat. Nos. 5,630,868 and 5,571,311 for a discussion of modified carbon pigments.

In another embodiment herein the black pigment is dispersed in the ink composition with the aid of a dispersing agent. Such black pigments include any black pigment that is dispersed with a dispersant having an anionic functionality, for example, the Joncryl® polymers available from S. C. Johnson Polymer (Racine, Wis.). Of course, any other dispersant exhibiting anionic charges may be employed in the practice of this invention. For a more complete discussion of black pigments and anionic dispersants see U.S. Pat. No. 5,181,045 and U.S. application, Ser. No. 08/567,974, now U.S. Pat. No. 5,785,743.

The following pigments are examples of available black pigments from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4.

Color inks—The color inks comprise at least one colorant, typically dyes or pigments. The dye or pigments may be nonionic, cationic, anionic, or mixtures thereof. Any of the color dyes or pigments known for use in ink-jet printing may be employed in the practice of this invention.

The following pigments are useful in the practice of this invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

Aqueous color dyes may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company.

Cationic Agent—The color inks will also comprise a cationic surfactant or cationic salt. The cationic salts are preferably selected from tetra alkyl or tetra aryl or tetra alkylaryl ammonium salts. The alkyl moieties may be any straight or branched hydrocarbon comprising saturated or unsaturated chains. Preferred alkyl units are selected from the group consisting of methyl, ethyl, butyl, hexyl, octyl, decyl, dodecyl and mixtures thereof. Preferred aryl units are selected from phenyl, benzyl, or alkylaryl subunits of 18 carbons or less. An example of a suitable cation is tetrabutyl ammonium cation. Another example is benzyltriethylammonium cation. The tetra alkyl ammonium salt is associated with an anionic counterion. The counterions are preferably selected from the group consisting of halides, bisulfite, bisulfate, dihydrogen phosphate, nitrate, nitrite, and mixtures thereof.

The concentration of cationic salt ranges from about 0.1 to about 7, preferably from about 1 to about 3, wt % in the ink composition. Less than about 0.1 wt % has been found to be not as effective in black to color bleed control.

Alternatively, the color inks employed herein may contain a cationic surfactant. The cationic surfactant should be present in the ink composition at a concentration ranging from about 0.5 to about 5 wt %. Preferably, the cationic surfactant is employed in the ink at a concentration of about 3 wt %. It is contemplated that any cationic surfactant finding use in ink-jet ink compositions may be employed in the practice of this invention. Examples of cationic surfactants that may be suitably used include, but are not limited to, polypropoxy quaternary ammonium acetates and polypropoxy quaternary ammonium chlorides. Such surfactants are commercially available from WITCO Corporation as the Emcol series. The cationic surfactant component may also comprise a mixture of appropriate cationic surfactants.

Examples of counterions that may be associated with the cationic surfactant useful herein include acetate, formate, chloride, gluconate, succinate, tartrate, glutarate, malonate, carboxylate, fumarate, malate, sebacate, adipate, stearate, oleate, laurate, benzoate, and citrate.

Other cationic surfactants such as substituted amine oxides are also useful in the practice of this invention. See U.S. Pat. No. 5,106,416, "Bleed Alleviation Using Zwitterionic Surfactants and Cationic Dyes" for a list of amine oxides. Specific examples of amphiphiles/surfactants that may be preferably employed in the practice of this invention include, but are not limited to, iso-hexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide.

Organic Acid—Optionally, the color dyes herein may additionally contain an organic acid component to aid in bleed control. A relatively small amount of this organic acid has been found to enhance the bleed control benefits of the cationic salt or cationic surfactant. Therefore, the organic acid, if present, should be in the range of from about 0.5% to about 4%, preferably from about 1% to about 3%, more preferably about 2%, by wt of the ink composition. Examples of organic acids that may be suitably employed in the practice of this invention include: mono-, di- and polyfunctional organic acids. Preferably, one of the following classes of organic acids is employed: polyacrylic, acetic, glycolic, malonic, malic, maleic, ascorbic, succinic, glutaric, fumaric, citric, tartaric, lactic, sulfonic, and orthophosphoric acid and derivative thereof.

All concentrations herein are in weight percent, unless otherwise indicated. The purity of all components is that employed in normal commercial practice for ink-jet inks. All reference are hereby incorporated by reference.

Ink-jet Ink Vehicle—The ink comprises the colorants and cationic surfactant or salt above plus a vehicle. For a discussion of inks and their properties, see *The Printing Manual*, 5$^{th}$ ed. Leach et al. (Chapman and Hall, 1993). See also U.S. Pat. Nos. 2,833,736; 3,607,813; 4,104,061; 4,770,706; and 5,026,755.

A typical formulation for an ink useful in the practice of the invention includes one or more cosolvents (0 to about 50 wt %), one or more water-soluble surfactants/amphiphiles (0 to about 40, preferably about 1 to about 5, wt %) (these are added to the vehicle and are in addition to any cationic surfactant used in the color ink for bleed control), one or more high molecular weight colloids (0 to about 3 wt %), and water (balance).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from 0 to about 50 wt %, with about 0.1 to 15 wt % being preferred.

Water-soluble surfactants may be employed in the formulation of the vehicle of the ink. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; protonated POE amines; POE amides; and dimethicone copolyols.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the colorants and cationic bleed control additives disclosed herein.

INDUSTRIAL APPLICABILITY

The inclusion of a cationic surfactant or salt in color inks and anionic black pigments in ink sets is expected to find use in inks employed in ink-jet printing.

EXAMPLE

Two different black pigmented inks were printed along side three color inks (yellow)—the first containing succinic acid only; the second containing tetrabutylammonium nitrate only, and the third a mixture of succinic acid and tetrabutylammonium nitrate.

The formulation of Black Ink A comprises CABOJET 300, a self-dispersing carbon black pigment obtained from Cabot Corporation.

The formulation of Black Ink B comprises a polymer dispersed carbon black pigment.

The formulation of Color Ink A comprises pentanediol, 2-pyrrolidone, 1.5% cosurfactant, 7% succinic acid.

The formulation of Color Ink B comprises pentanediol, 2-pyrrolidone, 1.5% cosurfactant, and 3% tetrabutylammonium nitrate.

The formulation of Color Ink C comprises pentanediol, 2-pyrrolidone, 1.5% cosurfactant, 3% tetrabutylammonium nitrate, and 2% succinic acid.

A standard test pattern of the black ink and yellow ink was run with each of the black inks and color inks. Results with the self-dispersed pigmented ink and polymeric dispersed black ink are similar.

The test pattern with Black Ink A/Color Ink A and the test pattern with Black Ink B/Color Ink A both show evidence of black ink bleed into the yellow ink with noticeable fuzziness at the ink interfaces.

The test pattern with Black Ink A/Color Ink B and the test pattern with Black Ink B/Color Ink B both show an overall improvement in black to color bleed control when compared to Color Ink A, with a marked reduction in noticeable fuzziness at the ink interfaces.

The test pattern with Black Ink A/Color Ink C and the test pattern with Black Ink B/Color Ink C both show significant improvement in black to color bleed control when compared to Color Ink A or B, with a marked improvement in sharpness and minor amounts of noticeable fuzziness at the ink interfaces.

What is claimed is:

1. An ink-jet ink set for ink-jet printing comprising at least one color ink and at least one black ink, wherein said black ink comprises at least one anionic pigment and wherein said color ink comprises a) at least one colorant and b) source of cations selected from the group consisting of cationic surfactants, cationic salts, a tetra alkyl ammonium salt, wherein said alkyl moieties are straight or branched hydrocarbon comprising saturated or unsaturated chains or aromatic subunits of 18 carbons or less.

2. An ink-jet ink set according to claim 1 wherein said black ink comprises said black pigment and a dispersing agent.

3. An ink-jet ink set according to claim 1 wherein said anionic pigment is a self-dispersing pigment.

4. An ink-jet ink set for ink-jet printing according to claim 3 wherein said anionic pigment comprises anionic functional groups selected from the groups consisting of carboxylate, sulfonate and mixtures thereof.

5. An ink-jet ink set according to claim 1 wherein said color ink comprises from about 0.1% to about 7 wt % of a tetra alkyl ammonium salt.

6. An ink-jet ink set according to claim 1 wherein said alkyl moieties are selected from the group consisting of methyl, butyl, ethyl, hexyl, octyl, decyl, dodecyl, phenyl, benzyl, and mixtures thereof.

7. An ink-jet ink set according to claim 6 wherein said tetra alkyl ammonium salt is selected from the group consisting of tetrabutylammonium nitrate, benyltriethylammonium nitrate, and mixture thereof.

8. An ink-jet ink set according to claim 1 wherein said colorant in said color ink is selected from the groups consisting of nonionic dye, nonionic pigment, anionic dye, anionic pigment, cationic dye, cationic pigment, or mixtures thereof.

9. An ink-jet ink set according to claim 1 wherein said inks further comprise an inkjet ink vehicle.

10. An inkjet ink set according to claim 9 wherein said color ink further comprise an organic acid.

11. An ink-jet ink set according to claim 10 wherein said color ink comprises from about 1% to about 3 wt % of the organic acid.

12. An ink-jet ink set according to claim 11 wherein said organic acid is a succinic acid.

13. A method of reducing color bleed between black ink and color ink, comprising formulating said black ink with at least one anionic pigment and formulating said color ink with a) at least one colorant and with b) selected from the group consisting of cationic surfactants, cationic salts, and mixtures a tetra alkyl ammonium salt, wherein said alkyl moieties are straight or branched hydrocarbon comprising saturated or unsaturated chains or aromatic subunits of 18 carbons or less.

14. A method of reducing color bleed according to claim 13 wherein said black ink and said color ink are further formulated with an ink-jet vehicle.

15. A method of reducing color bleed between black ink and color ink according to claim 14 wherein said color ink comprises from about 0.1% to about 7 wt % of said tetra alkyl ammonium salt.

16. A method of reducing color bleed between black ink and color ink according to claim 13 wherein said alkyl moieties are selected from the group consisting of methyl, ethyl, butyl, hexyl, octyl, decyl, dodecyl, phenyl, benzyl, and mixtures thereof.

17. A method of reducing color bleed between black ink and color ink according to claim 16 wherein said tetra alkyl ammonium salt is selected from the group consisting of tetrabutylammonium nitrate, benyltriethylammonium nitrate, and mixtures thereof.

18. A method of reducing color bleed between black ink and color ink according to claim 13 wherein said colorant in said color ink is selected from the groups consisting of nonionic dye, nonionic pigment, anionic dye, anionic pigment, cationic dye, cationic pigment, or mixtures thereof.

19. A method of reducing color bleed between black ink and color ink according to claim 13 wherein said black ink comprises said black pigment and a dispersing agent.

20. A method of reducing color bleed between black ink and color ink according to claim 13 wherein said anionic pigment is a self-dispersing pigment.

21. A method of reducing color bleed between black ink and color ink according to claim 20 wherein said anionic pigment comprises anionic functional groups selected from the groups consisting of carboxylate, sulfonate and mixtures thereof.

22. A method of reducing color bleed between black ink and color ink according to claim 13 wherein said color ink further comprise an organic acid.

23. A method of reducing color bleed between black ink and color ink according to claim 22 wherein said color ink comprises from about 1% to about 3 wt % of the organic acid.

24. A method of reducing color bleed between black ink and color ink according to claim 23 wherein said organic acid is succinic acid.

* * * * *

UNITED STATES PATENT AND TRADEMARK OFFICE
CERTIFICATE OF CORRECTION

| | | |
|---|---|---|
| PATENT NO. | : 6,036,759 | Page 1 of 1 |
| APPLICATION NO. | : 09/070858 | |
| DATED | : March 14, 2000 | |
| INVENTOR(S) | : Wickramanayake et al. | |

It is certified that error appears in the above-identified patent and that said Letters Patent is hereby corrected as shown below:

Column 7, Line 11, "source of cations selected from the group consisting of cationic surfactants, cationic salts," should be deleted.

Signed and Sealed this

Seventeenth Day of July, 2007

JON W. DUDAS
*Director of the United States Patent and Trademark Office*